May 26, 1931. T. R. PAULSEN 1,806,819
TRACTOR
Filed July 31, 1929 3 Sheets-Sheet 2
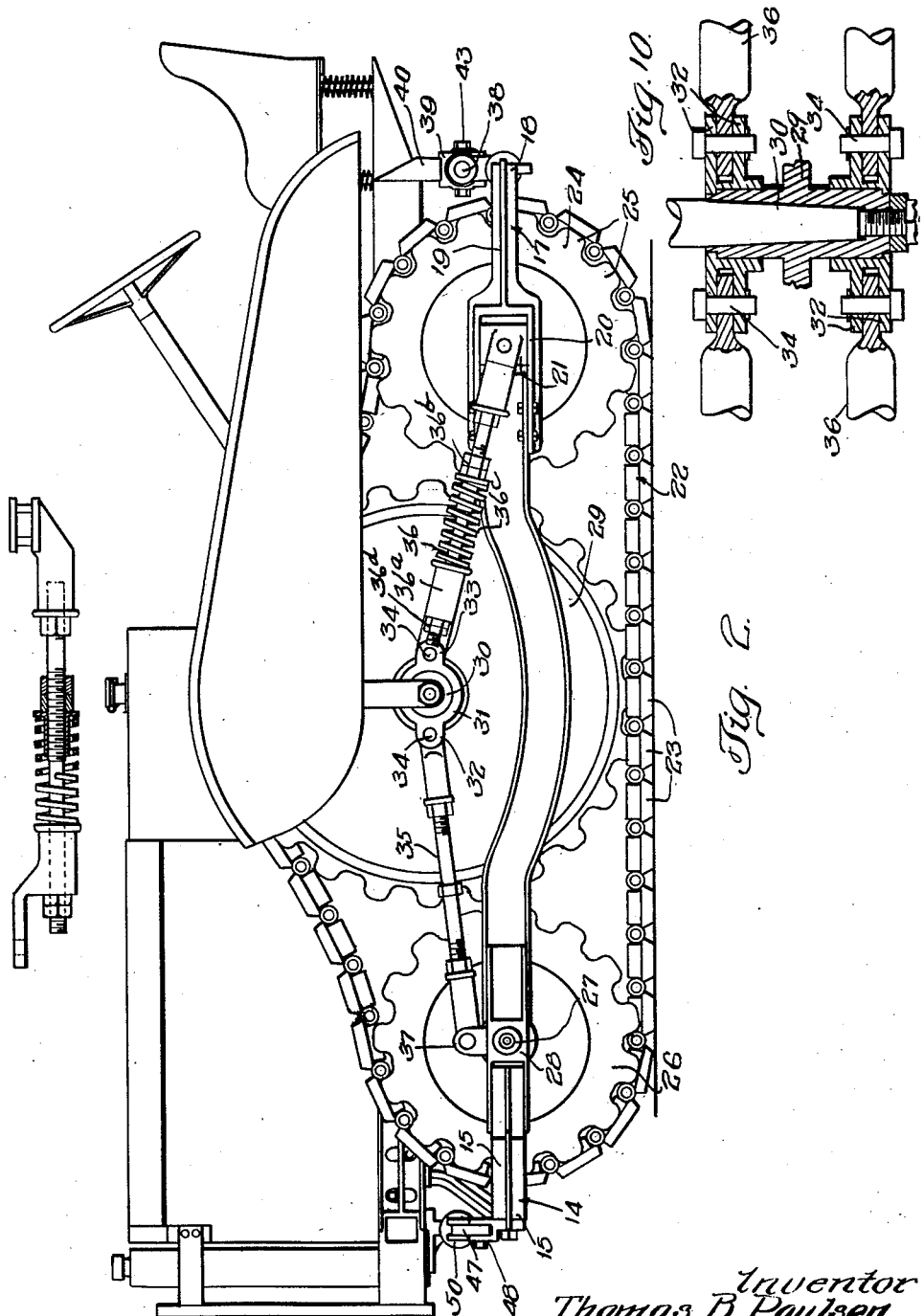

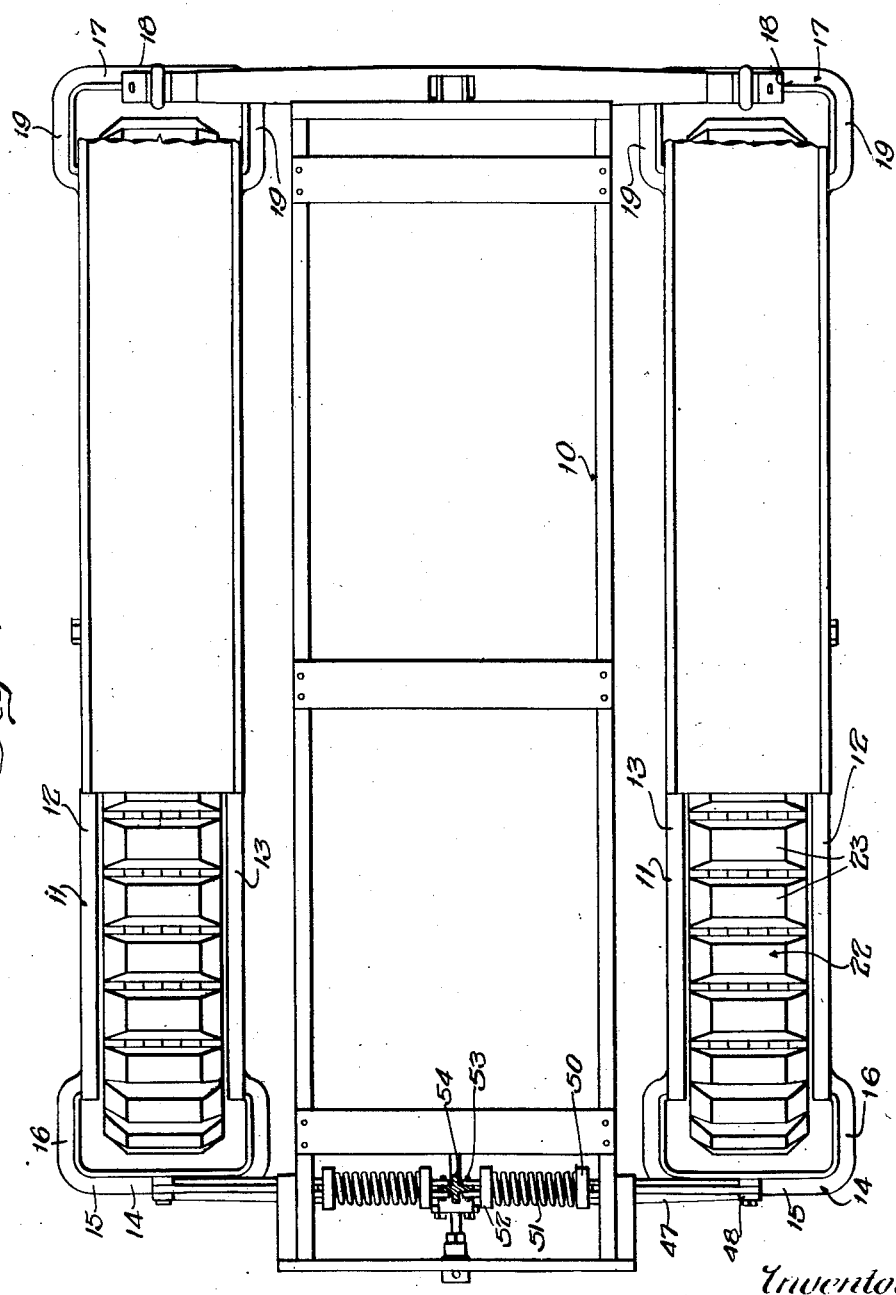

May 26, 1931. T. R. PAULSEN 1,806,819
TRACTOR
Filed July 31, 1929 3 Sheets-Sheet 3
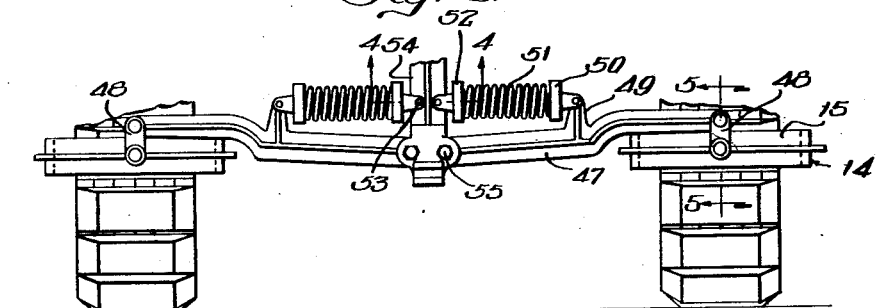
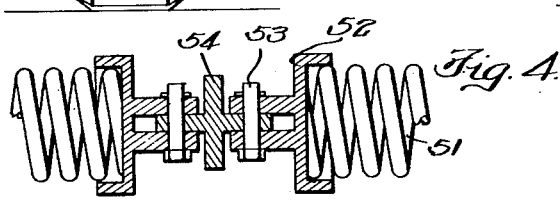
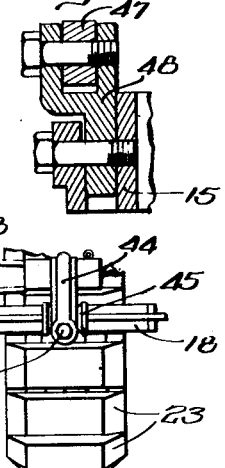
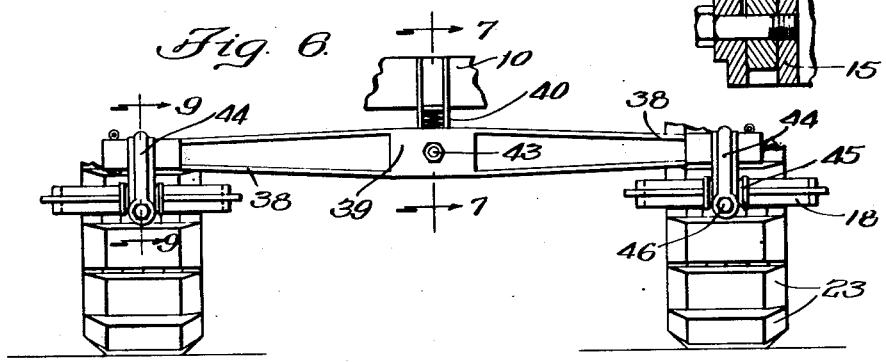
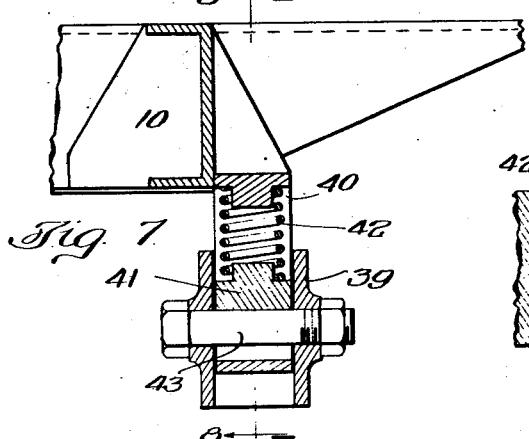
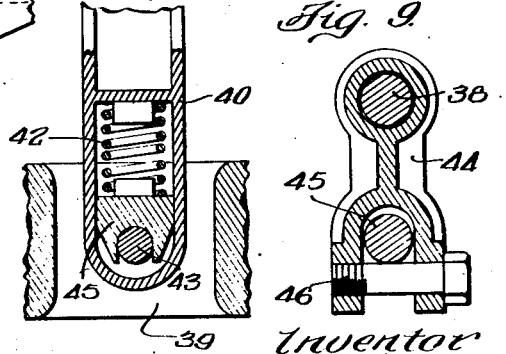
Inventor
Thomas R. Paulsen Patented May 26, 1931

1,806,819

UNITED STATES PATENT OFFICE

THOMAS R. PAULSEN, OF LOS ANGELES, CALIFORNIA, ASSIGNOR TO ADVANCE-RUMELY COMPANY, OF LA PORTE, INDIANA, A CORPORATION OF INDIANA

TRACTOR

Application filed July 31, 1929. Serial No. 382,401.

The present invention relates to certain features of construction included in a tractor which embodies preferably the track and driving instrumentalities described and illustrated in the Paulsen Patent No. 1,255,218, issued February 5, 1918, although the features hereinafter to be described and claimed might be advantageously used in connection with tractors generally.

The present invention is directed to the means provided for connecting and suspending the main frame between the truck frames in such a manner as to permit partial independence of movement of the truck frames within advantageous limits, thereby permitting the respective tracks to accommodate themselves more readily to local inequalities in the ground contour, without imparting excessive motion to the main frame.

By affording equalizing connections for the truck frames at one end of the tractor, and by providing independently operating spring connections at the other end of the tractor, and by affording a partial freedom of movement to the tracks and carrying wheels within the respective truck frames, a structure is provided which combines and advantageously utilizes the respective features above mentioned in such a way as to afford unusual stability and ease of motion to the machine as a whole, and at the same time affords the necessary freedom in adaptation to ground conditions to maintain a high tractive efficiency at all times.

Further objects and details of the present invention will be indicated in the specification, in conjunction with the accompanying drawings, wherein,—

Figure 1 is a plan view of the chassis of the tractor, showing the mode of connection between the main frame and the associated truck frames;

Fig. 2 is a side elevation of a tractor embodying in combination the features of the present invention;

Fig. 3 is a front elevation of the frame connections;

Fig. 4 is a detail showing the mountings for the front springs;

Fig. 5 is a detail in section, taken on line 5—5 of Fig. 3;

Fig. 6 is a rear end elevation of the frame connections;

Fig. 7 is a sectional detail showing the method of pivoting the equalizer bar to the main frame;

Fig. 8 is a sectional detail, taken on line 8—8 of Fig. 7;

Fig. 9 is a sectional detail of the link connection between the equalizer bar and one of the truck frames; and Fig. 10 is a detail of the main shaft and parts carried thereby.

The machine as a whole comprises a main frame 10 which in the present instance is conventionally illustrated, and which, however, may be of any desired shape or structure, depending upon the manner in which the engine and transmission mechanisms are supported, which features, however, form no portion of the present invention.

The main frame is associated with a pair of truck frames 11, one on each side, each truck frame comprising an outer side rail 12 and an inner side rail 13 of downwardly bowed or arcuate formation.

The side rails are connected at their forward ends by a front head frame 14 comprising a cross bar 15 and rearwardly extending side bars 16, which latter are bolted or otherwise rigidly secured to the side rails. The side rails at their rear ends are connected by a similar rear head frame 17 comprising a cross bar 18 and side bars 19, which latter are bolted or otherwise connected to the rear ends of the side rails.

The side rails of the rear head frame are spread or bifurcated to afford guide mountings 20 for the reception of slide blocks 21 which are afforded a limited fore and aft movement. Each of the truck frames is thus of elongated open rectangular formation to afford a mounting for an endless track 22 composed of pivotally connected tread sections 23. Each pair of slide blocks 21 affords a journal mounting for an idle gear wheel 24 provided with teeth 25 adapted to suitably mesh with the tread sections of the endless track. A similar gear wheel 26 is located at the forward end of each of the truck frames and is mounted upon a shaft 27 mounted in a journal 28 located immediately to the rear of the forward head frame.

Between the two idle gear wheels is located the main center driving gear wheel 29 which is preferably of larger diameter than the idle wheels and is carried by a shaft 30 which is extended through inner and outer journal rings 31, each provided with a pair of forwardly projecting spaced lugs 32 and rearwardly projecting spaced lugs 33. The lugs carry pivot pins 34 which afford pivotal mountings for a forward pair of radius rods 35 and a rear pair of radius rods 36. The rear radius rods are connected with the slide blocks 21, while the forward radius rods are pivoted to lugs 37 upwardly projecting from the journal mountings which carry the forward idle shaft. The rear radius rod 36 telescopes through a sleeve $36^a$ which receives the pivot 34, and is provided with jamb nuts $36^b$ which serve to regulate the tension of a coil spring $36^c$. Nuts $36^d$ serve to limit the retraction of the radius rod, and the spring affords a cushioning effect in regulating the fore and aft movements of the slide blocks.

The arrangement of these parts is substantially the same as that shown in the Paulsen patent previously referred to, and is designed to afford means for permitting flexing of the ground run of each track with a compensating movement of the slidably mounted idle wheel which will freely adjust itself in conformity with the up and down movements imparted to the main driving wheel through the pivoted radius rods.

Each of the rear head frames is secured to a transverse equalizer bar 38, which is in the form of a walking beam which is cored through its center 39 to embrace a fixed bracket 40 which depends from the rear cross rail of the main frame. The bracket is open in the center to afford a mounting for a slide block 41 which bears against a coil spring 42.

The equalizer bar is pivoted by a pin 43 entered through the slide block, so that it is free to move thereon as a pivotal center, while the slide block itself is afforded limited freedom of movement against the resistance of the coil spring 42. Each end of the equalizer bar is connected with the associated head frame through the medium of a link 44, which is pivotally mounted at its upper end upon the end of the equalizer bar, and is bifurcated at its lower end to embrace a rounded bridge piece 45 which constitutes a portion of the end wall of the head frame, which is cut away below the bridge piece to afford a clearance for the insertion of a bolt 46 which spans the space between the bifurcated ends of the link 44. This arrangement allows the link as a whole to swivel in a vertical plane upon the end of the equalizer bar and also to swivel upon the bridge piece, while sufficient freedom of movement is afforded to compensate for the transverse swinging movement of the link occasioned by the up and down movements of the equalizer bar, the connections being sufficiently free to afford the necessary movements without binding or cramping.

The forward ends of the truck frames are individually connected to the main frame in each case by the provision of a link bar 47, each link bar being pivoted at its outer end to a shackle 48, which in turn is pivoted to the associated forward head frame. Each of the link bars at a point slightly inside of its center is provided with an upstanding arm 49 to which is pivoted a disk 50 which furnishes a socket for the outer end of a coil spring 51, the inner end of which bears against a similar disk 52, pivoted by a pin 53 to a front bracket 54, which is rigid with the main frame and which also pivots the inner ends of the two link bars, each link bar being individually pivoted upon a pivot pin 55.

From the foregoing description it will be noted that the truck frames at the rear end are secured to the main frame through the medium of an equalizer bar, so that the rear ends of the truck frames will move up and down in opposition to one another, while the forward ends of the truck frames will move independently of one another, acting in each instance against the resistance of the associated spring.

This method of confining the equalizing feature to one end with the independent movements at the opposite end affords a restricted independence of action to the respective truck frames and the tracks carried thereby, while at the same time restraining such independence of action within desirable limits, so that a part at least of the movement imparted to one of the tracks will be reflected in the action transmitted through the equalizer bar to the other track. This results in a stabilizing of the action of the machine as a whole to a desirable degree, so that the tracks and truck frames exert a steadying influence on one another, without, however, unnecessarily restricting the independence of movement of the respective tracks and truck frames in accommodating themselves to moderate inequalities in the ground contour.

At the same time, by securing the forward ends of the truck frames to the outer ends of the link bars independently acting against spring resistance, the forward ends of the truck frames are permitted to independently move up and down on a long radius, so that each will accommodate itself to moderate variations in ground conditions without imparting excessive movements to the main frame of the tractor.

The arrangement, moreover, is one which locates the respective front and rear connections at the greatest possible distance from one another by locating these connections beyond the front and rear ends of the truck frames, so that an easy movement will be afforded and abrupt shocks or vibrations reduced to a minimum.

This method of mounting the truck frames, in conjunction with the means afforded for permitting the tracks to flex themselves in conformity with the ground contour, as well as the means provided for permitting the driving and idler wheels to automatically adjust their relation to one another in conformity with the flexation of the associated track, all combine to render the action of the tractor as a whole steady and free from excessive jolts or vibrations even when operating in extremely rough ground.

I claim:

1. In a tractor, the combination of a main frame, a truck frame on each side of the main frame, a driving wheel and an idle wheel journalled within each truck frame, an endless track carried by said wheels, an equalizer bar pivoted to the main frame and having its outer ends connected respectively to one end of each of the truck frames, and link bars independently pivoted at their outer ends to the other ends of the respective truck frames, and pivoted at their inner ends to the main frame.

2. In a tractor, the combination of a main frame, a truck frame on each side of the main frame, a driving wheel and an idle wheel journalled within each truck frame, an endless track carried by said wheels, an equalizer bar pivoted to the main frame and having its outer ends connected respectively to one end of each of the truck frames, link bars independently pivoted at their outer ends to the other ends of the respective truck frames, and pivoted at their inner ends to the main frame, a spring for each of the link bars, an arm upstanding from each link bar bearing against the outer end of the associated spring, and an abutment fixed to the main frame for the inner end of each spring.

3. In a tractor, the combination of a main frame, a truck frame on each side of the main frame, a driving wheel centrally located in each of the truck frames, front and rear idle wheels journalled in each of said truck frames, one of said idle wheels being slidably journalled with relation to the truck frame, front and rear radius rods having their proximate ends hingedly connected to the axle of the driving wheel, and having their outer ends hingedly connected one to the truck frame and the other to the shaft of the slidably mounted idle wheel, an endless track for each truck frame, carried around the driving wheel and the front and rear idle wheels and adapted to flex in conformity with the ground contour, an equalizer bar pivoted to the main frame and having its outer ends connected respectively to one end of each of the truck frames, and link bars independently pivoted at their outer ends to the other ends of the respective truck frames, and pivoted at their inner ends to the main frame.

4. In a tractor, the combination of a main frame, a truck frame on each side of the main frame, a driving wheel centrally located in each of the truck frames, front and rear idle wheels journalled in each of said truck frames, one of said idle wheels being slidably journalled with relation to the truck frame, front and rear radius rods having their proximate ends hingedly connected to the axle of the driving wheel, and having their outer ends hingedly connected one to the truck frame and the other to the shaft of the slidably mounted idle wheel an endless track for each truck frame, carried around the driving wheel and the front and rear idle wheels and adapted to flex in conformity with the ground contour, an equalizer bar pivoted to the main frame and having its outer ends connected respectively to the truck frames, link bars independently pivoted at their outer ends to the ends of the respective truck frames, and pivoted at their inner ends to the main frame, and independent compression springs, one for each of the link bars, each interposed between the associated link bar and a portion of the main frame and adapted to resist pivotal movement of the associated link bar.

5. In a tractor, the combination of a main frame, a truck frame on each side of the main frame, a driving wheel centrally located in each of the truck frames, front and rear idle wheels journalled in each of said truck frames, one of said idle wheels being slidably journalled with relation to the truck frame, front and rear radius rods having their proximate ends hingedly connected to the axle of the driving wheel, and having their outer ends hingedly connected one to the truck frame and the other to the shaft of the slidably mounted idle wheel, an endless track for each truck frame, carried around the driving wheel and the front and rear idle wheels and adapted to flex in conformity with the ground contour, an equalizer bar pivoted to the main frame and having its outer ends connected respectively to the truck frames, link bars independently pivoted at their outer ends to the ends of the respective frames, and pivoted at their inner ends to the main frame, a spring for each of the link bars, an arm upstanding from each link bar and bearing against the outer end of the associated spring, and an abutment fixed to the main frame for the inner end of each spring.

6. In a tractor, the combination of a main frame, a pair of truck frames, each of elongated open rectangular shape, comprising side rails and connecting head frames, driving and idle wheels associated with each of the truck frames, an endless track carried by each set of wheels, a rigid equalizer bar extending transversely of and pivoted in its center to the main frame, link connections for each end of the equalizer bar with the proximate end head frame of the associated truck frame, to compel the connected ends of the respective truck frames to rise and fall in opposition to one another, a pair of link bars at the opposite end of the main frame, having their inner ends pivotally connected to the main frame, and shackle connections for the outer ends of the respective link bars and the proximate head frame of the associated truck frame.

7. In a tractor, the combination of a main frame, a pair of truck frames, each of elongated open rectangular shape, comprising side rails and connecting head frames, driving and idle wheels associated with each of the truck frames, an endless track carried by each set of wheels, an equalizer bar pivoted in its center to the main frame near one end thereof, link connections for each end of the equalizer bar with the proximate end head frame of the associated truck frame, a pair of link bars at the opposite end of the main frame, having their inner ends pivotally connected to the main frame, and shackle connections for the outer ends of the respective link bars and the proximate head frame of the associated truck frame, an arm upstanding from each of the link bars, and a spring having its outer end in compressive relation to said arm and having its inner end in compressive relation to the main frame.

8. In a tractor, the combination of a main frame, a pair of truck frames, each of elongated open rectangular shape, comprising side rails and connecting head frames, a driving wheel centrally located in each of the truck frames, front and rear idle wheels journalled in each of said truck frames, one of said idle wheels being slidably journalled with relation to the truck frame, front and rear radius rods having their proximate ends hingedly connected to the axle of the driving wheel, and having their outer ends hingedly connected one to the truck frame and the other to the shaft of the slidably mounted idle wheel, an endless track for each truck frame, carried around the driving wheel and the front and rear idle wheels and adapted to flex in conformity with the ground contour, an equalizer bar pivoted in its center to the main frame, link connections for each end of the equalizer bar with the proximate end head frame of the associated truck frame, a pair of link bars at the opposite end of the main frame, having their inner ends pivotally connected to the main frame, and shackle connections for the outer ends of the respective link bars and the proximate head frame of the associated truck frame.

9. In a tractor, the combination of a main frame, a pair of truck frames, each of elongated open rectangular shape, comprising side rails and connecting head frames, a driving wheel centrally located in each of the truck frames, front and rear idle wheels journalled in each of said truck frames, one of said idle wheels being slidably journalled with relation to the truck frame, front and rear radius rods having their proximate ends hingedly connected to the axle of the driving wheel, and having their outer ends hingedly connected one to the truck frame and the other to the shaft of the slidably mounted idle wheel, an endless track for each truck frame, carried around the driving wheel and the front and rear idle wheels and adapted to flex in conformity with the ground contour, an equilizer bar pivoted in its center to the main frame, a link connection for each end of the equalizer bar with the proximate end head frame of the associated truck frame, a pair of link bars at the opposite end of the main frame, having their inner ends pivotally connected to the main frame, and shackle connections for the outer ends of the respective link bars and the proximate head frame of the associated truck frame, an arm upstanding from each of the link bars, and a spring having its outer end in compressive relation to said arm, and having its inner end in compressive relation to the main frame.

In witness that I claim the foregoing I have hereunto subscribed my name this 12th day of July, 1929.

THOMAS R. PAULSEN.